C. D. VERNON & J. P. MORNINGSTAR.
NUT LOCKING EXPANSION BOLT.
APPLICATION FILED MAR. 31, 1909.
942,226.
Patented Dec. 7, 1909.
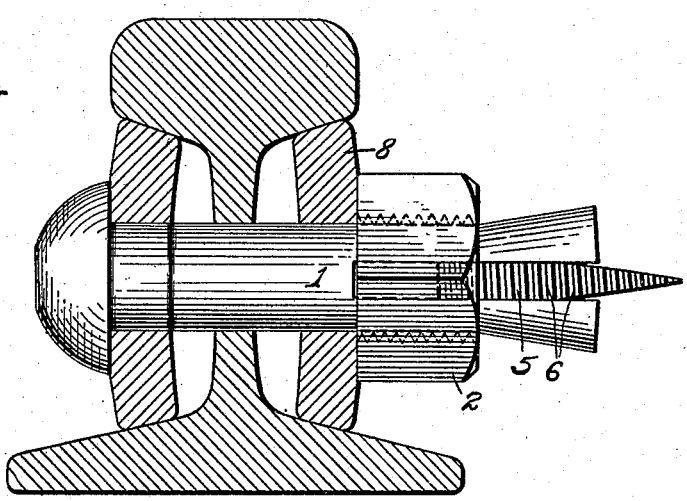
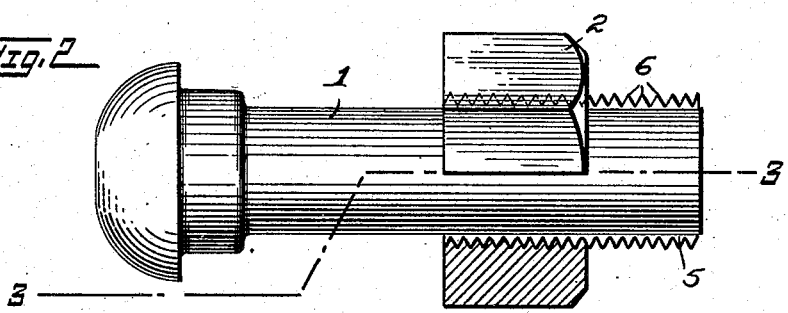
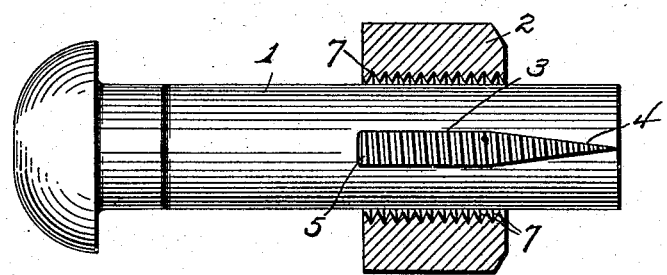
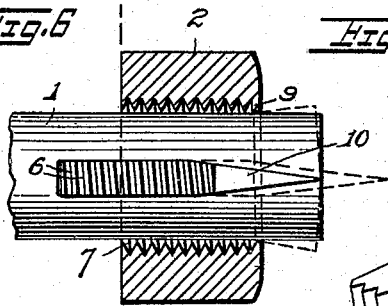
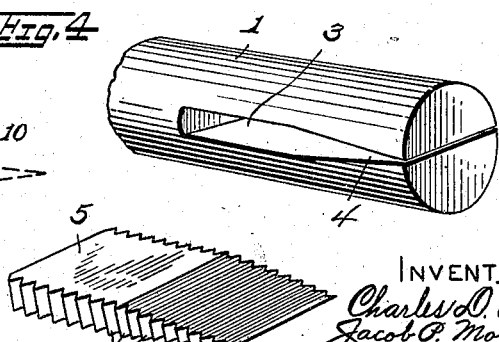

UNITED STATES PATENT OFFICE.

CHARLES D. VERNON AND JACOB P. MORNINGSTAR, OF WHEELING, WEST VIRGINIA; SAID MORNINGSTAR ASSIGNOR TO SAID VERNON.

NUT-LOCKING EXPANSION-BOLT.

942,226.   Specification of Letters Patent.   Patented Dec. 7, 1909.

Application filed March 31, 1909. Serial No. 486,852.

*To all whom it may concern:*

Be it known that we, CHARLES D. VERNON and JACOB P. MORNINGSTAR, citizens of the United States of America, and residents of Wheeling, county of Ohio, and State of West Virginia, have invented certain new and useful Improvements in Nut-Locking Expansion-Bolts, of which the following is a specification.

This invention relates to nut-locking bolts, and it has for its primary object to provide a bolt whose nut-locking end has means associated therewith whereby, when a nut is passed thereover into close bearing contact with a fixed surface or bearing wall, it is caused to expand behind the nut for holding both against retraction.

A further object is to provide a threadless bolt having means associated therewith whereby a nut may be caused to travel thereover and wherein the end of the bolt behind the nut will be automatically expanded, preventing retraction of the bolt, when free forward movement of the nut is retarded by a bearing wall through which the bolt is projected, the degree of expansion of said end being dependent upon the outward pressure to which the nut is subjected.

With these and other objects in view, the invention finally consists in the particular construction, arrangement and combination of parts which will hereinafter be fully described, reference being herein had to the accompanying drawings, forming a part of this specification, in which—

Figure 1 is a side elevation of the invention, showing it applied to a railway-rail for securing fish-plates in position, the latter and the rail being shown in cross-section; Fig. 2 is a side elevation of the invention viewed from a point at right angles to the point of view in Fig. 1, the nut being shown in partial cross-section; Fig. 3 is a partial sectional view taken on line 3—3, Fig. 2, the bolt and wedge being shown in elevation; Fig. 4 is a detail perspective view of a broken portion of the bolt; Fig. 5 is a similar view of the wedge; and—Fig. 6 is a view similar to Fig. 3, showing a modified formation of the nut and wedge.

Referring to said drawings, in which like reference numerals designate like parts throughout the several views—1 indicates a threadless bolt which has a slot therein extending from a point substantially midway of its length to and through its nut-receiving end, as shown, said slot being of even width from its inner end for a distance substantially equal to the thickness of the nut 2 to be received thereon, as shown at 3, and thence tapering inward to the end of the bolt, as shown at 4. A wedge 5 of a thickness and shape substantially corresponding to that of the slot, but having a greater width than the diameter of the bolt, is adapted to be inserted in the slot with its lateral edges, which are provided with teeth 6, standing outside said slot. Said teeth are spaced and have an inclination to correspond with threads 7 of the nut 2, so that, when the bolt is mounted in place and the wedge properly inserted, said nut will travel over the bolt upon said teeth.

When the inner face of the nut engages a fixed wall or surface, as the fish-plate 8, Fig. 1, and its free forward movement is thereby retarded, it immediately begins to force outward upon the wedge. Continued forced movement of the nut causes the wedge to slowly move outward along the slot in which it is received and to gradually effect the spreading of the divided end of the bolt.

It will be noted that the bolt has a greater length than the ordinary railway-rail bolt and that this increased length is demanded in order that the nut may have nearly, if not quite, passed from the tapered portion of the wedge before engagement is had with the bearing wall or surface of the structure through which the bolt is projected, and, consequently, in order that undue outward spreading or expansion of the end of the bolt may not occur within the bore of the nut.

As shown in Fig. 6, the threads of the nut may terminate at a point adjacent to its outer face, leaving an angular internal flange 9 which is adapted to receive the pressure produced by the expansion of the end of the bolt, and thus serves not only to prevent mutilation of the threads, but also affords a non-bruisable portion for receiving such of the expansion as takes place at the outer end of the nut. In the construction just described the wedge has the teeth omitted from its edges for a distance rearward from the point thereof, as shown at 10 in Fig. 6, so that it will pass outward by said flange without hindrance from the latter.

Having thus described our invention, what we claim as new, and desire to secure by Letters Patent, is—

1. In a device of the character described, a threadless bolt having a tapered slot therein, and a wedge seated in said slot with its lateral edges toothed and projected outward therefrom, said wedge being adapted to be forced outward by a nut threaded thereon against a bearing wall for expanding the end of the bolt.

2. In a device of the character described, a threadless bolt having a tapered slot in its nut-receiving end, a wedge corresponding substantially in size and form with said slot mounted in the latter with its lateral edges projected outward therefrom, teeth carried by said lateral edges, said wedge being adapted to move outward to expand the end of the bolt behind the nut when the latter assumes a position in bearing engagement with a wall through which the bolt is projected.

3. In nut and bolt interlocking means, the combination with a structure to be secured, of a bolt projected therethrough, said bolt having a slot in its nut-receiving end, the outer end of said slot being tapered and the remainder thereof being of even width, a wedge movably mounted in said slot, said wedge corresponding substantially in form with said slot and having its lateral edges projected outward therefrom, teeth carried by said edges, and an interiorly-threaded nut whose bore is of a greater diameter than the diameter of the bolt, the threads of said nut being in traveling engagement with the teeth of the wedge and said nut being adapted to exert an outward force upon the wedge for expanding the end of the bolt when it assumes pressure-exerting position with relation to said structure.

4. In nut and bolt interlocking means, a threadless bolt having a slot in its nut-receiving end, said slot being tapered at its outer end and having an even width from said taper inward, a wedge adapted to be inserted laterally in said slot, said wedge corresponding substantially in size and form with said slot and having a greater width than the diameter of the bolt, teeth having a slight inclination carried by the lateral edges of said wedge, and a nut having threads adapted for traveling upon the teeth of the wedge, said nut being adapted when in engagement with a forward movement-retarding surface or structure to exert an outwardly-directed force upon the wedge for expanding the end of the bolt.

5. In a device of the character described, a bolt having a slot therein and a wedge seated in said slot with its lateral edges toothed and projected outward therefrom, said wedge being adapted for receiving a nut thereon and for movement in said slot to expand the bolt behind the nut when the latter assumes a non-progressive position with relation to the bolt.

In testimony whereof we affix our signatures in presence of two witnesses.

CHARLES D. VERNON.
JACOB P. MORNINGSTAR.

Witnesses:
H. E. DUNLAP,
E. W. SCHULTZ.